United States Patent
Rigrod

[11] 3,883,221
[45] May 13, 1975

[54] PORTABLE PRISM-GRATING COUPLER

[75] Inventor: William Walter Rigrod, Colts Neck, N.J.

[73] Assignee: Bell Telephone Laboratories, Incorporated, Murray Hill, N.J.

[22] Filed: Feb. 1, 1974

[21] Appl. No.: 438,843

[52] U.S. Cl. ....... 350/96 C; 350/96 WG; 350/162 R
[51] Int. Cl. ...................... G02b 5/14; G02b 27/38
[58] Field of Search ..................... 350/96 WG, 96 C

[56] References Cited
UNITED STATES PATENTS

| | | | |
|---|---|---|---|
| 3,674,335 | 7/1972 | Ashkin et al. | 350/96 WG |
| 3,719,906 | 3/1973 | Tournois | 350/96 WG X |
| 3,791,715 | 2/1974 | Lean et al. | 350/96 WG |

*Primary Examiner*—John K. Corbin
*Attorney, Agent, or Firm*—Wilford L. Wisner; Thomas C. O'Konski

[57] ABSTRACT

There is disclosed a portable, reusable prism coupler which, unlike conventional prism couplers, need not be of higher refractive index than that of the thin-film waveguide into which the light is to be introduced. Structurally, there is fabricated on the surface of the prism which is disposed nearest to the thin-film waveguide a fixed optical grating. Grating periodicity is selected such that a beam of light incident on the grating inside the prism is internally diffracted essentially completely in a backward direction. By properly selecting the angle of incidence of the light beam on the grating, the evanescent field of the diffracted portion of the beam can be phase-matched and coupled through the separation between the prism and the waveguide to the various propagating modes therein. Since the refractive index of the prism is essentially uncritical, the arrangement should be particularly useful for coupling light into and out of thin-film waveguides formed of materials having relatively high refractive indices (e.g., gallium arsenide). The arrangement may likewise be useful for the large scale, nondestructive testing of thin-film waveguides as they are fabricated on the production line.

10 Claims, 2 Drawing Figures

PORTABLE PRISM-GRATING COUPLER

BACKGROUND OF THE INVENTION

This invention relates to an arrangement for coupling free-space light waves to thin-film light guides.

The adaptation of circuit integration techniques to optical frequency ranges for use in optical communication systems, optical data processing and other optical systems has been the subject of considerable recent investigation. The advantages of integrated circuit structures in the optical range are equivalent to the advantages of such structures at lower frequencies. Miniaturization, ruggedness, and reproducibility at low cost are a few of the desirable features realizable with integrated optical circuitry.

The basic building block in any integrated optical circuit arrangement is the thin-film light guide, wherein the guiding film is generally of a thickness approximating the wavelength of the light to be propagated therein. A persistent problem in the art has involved the search for suitable techniques for introducing light waves into the thin guiding film with reasonable degrees of efficiency. Several techniques for solving this problem have been proposed.

The most commonly used arrangement for efficiently feeding light into a thin-film structure is disclosed in U.S. Pat. No. 3,584,230 issued to P. K. Tien on June 8, 1971. The arrangement involves the use of an internally reflecting prism which is disposed in close proximity to a major surface of the thin film. Incident light is totally reflected at the base of the prism and the waves in the prism are coupled to the desired waveguide modes of the film through the evanescent fields of the light in the separation between the prism and the major surface of the film. Coupling efficiencies as high as 90 per cent are now common with this arrangement.

The principle advantage of the prism-film coupler stems from the fact that it readily permits the excitation of any one of the various waveguide modes of the film simply by properly selecting the angle of incidence of the beam on the prism base. As a result, the prism coupler has become a very useful device in the laboratory for investigating the guiding properties of various thin-film materials. To possess this capability, however, the index of refraction of the prism must be selected in each case to exceed that of the thin film and yet be transparent at the wavelength of light employed. Consequently, finding a suitable prism material to be used in coupling into a thin film formed of a material having a relatively high index of refraction (e.g., gallium arsenide) is difficult. Additionally, since more efficient operation can be achieved when the prism index is only slightly greater than that of the film, the prism material used in any particular arrangement typically varies depending upon the particular material of the film. It would be desirable if a particular prism could be detached from a particular thin film and reused many times for efficiently coupling into any of a variety of different thin-film materials.

Alternative arrangements for coupling light into a thin-film structure are disclosed in U.S. Pat. Nos. 3,674,335 issued to A. Ashkin et al., and 3,674,336 issued to H. W. Kogelnik, on June 4, 1972. Each of these arrangements couples light into a thin-film waveguide by means of an optical grating disposed along one of the major surfaces of the film. A beam of light is made incident on the grating at an angle such that one or more of the diffracted orders of the beam are trapped in the thin film. The principle advantage of the optical grating coupler is its relative lack of bulk as compared to the prism coupler. The principle disadvantage stems from the difficulty typically encountered in fabricating a precise optical grating on each separate film into which light is to be coupled. The requirement of precise grating fabrication for each film is particularly inconvenient where, for example, the coupler is to be used for the study of the properties of various thin-film materials in the laboratory or on the production line.

SUMMARY OF THE INVENTION

I have discovered an arrangement for coupling light into and out of thin-film waveguides which possesses most of the desirable features of the proven prism-film coupler and which, in addition, allows efficient coupling of the various waveguide modes in thin films substantially without regard to the refractive index of the film.

According to an illustrative embodiment of my invention, there is formed on a major surface of a conventional transparent prism, such as that employed in the conventional prism-film coupler, a fixed optical grating having a grating periodicity such that a beam of light incident on the grating from inside the prism is internally diffracted essentially completely in a backward direction. The grating, which illustratively comprises a periodic variation in the height of the prism surface, can be fabricated by any of a number of conventional techniques. The prism is then disposed with its grating surface opposed to a major surface of a thin-film optical waveguide and separated therefrom by a small coupling gap. A beam of the light to be coupled into the thin film is made incident through the prism at a selected angle on the grating and diffracted thereby. The evanescent field of the component of the diffracted portion of the beam parallel to the plane of the film can be phase-matched and coupled through the gap to a propagating waveguide mode in the film. As with conventional prism-film couplers, coupling in the prism-grating coupler of my invention is through evanescent fields in the gap between the prism and the film, and the particular waveguide mode excited in the film depends primarily upon the angle of incidence of the light beam on the prism surface. Unlike conventional prism-film couplers, however, the various waveguide modes can be efficiently excited in the film with the prism-grating coupler of my invention even though the refractive index of the film be greater than that of the prism. Accordingly, coupling into and out of thin films which have relatively high values of refractive index (e.g., gallium arsenide) is no problem with the arrangement.

Since the relative values of refractive index of the prism and the film are essentially uncritical in the prism-grating coupler of my invention, it may be particularly useful in the laboratory as a portable, reusable device for coupling light into and out of a wide variety of different thin-film materials. Additionally, since the optical grating is fabricated on a surface of the prism rather than on the surface of the thin-film light guide, the prism-grating coupler may likewise be useful for the large scale, nondestructive testing of thin-film waveguides as they are fabricated on the production line.

In a modified embodiment of my invention, the surface of the prism including the optical grating is coated with a thin protective layer of optically transparent cladding material which has an index of refraction that is substantially less than that of the prism and which forms a relatively flat exterior surface as compared to the prism surface. This cladding serves to maintain the optical quality of the grating through continued use of the coupler, as well as to avoid damage to the thin film into which light is to be coupled.

BRIEF DESCRIPTION OF THE DRAWING

These and other features and advantages of my invention will be better understood from the following detailed description taken in conjunction with the accompanying drawing in which.

DETAILED DESCRIPTION

Figure 1:
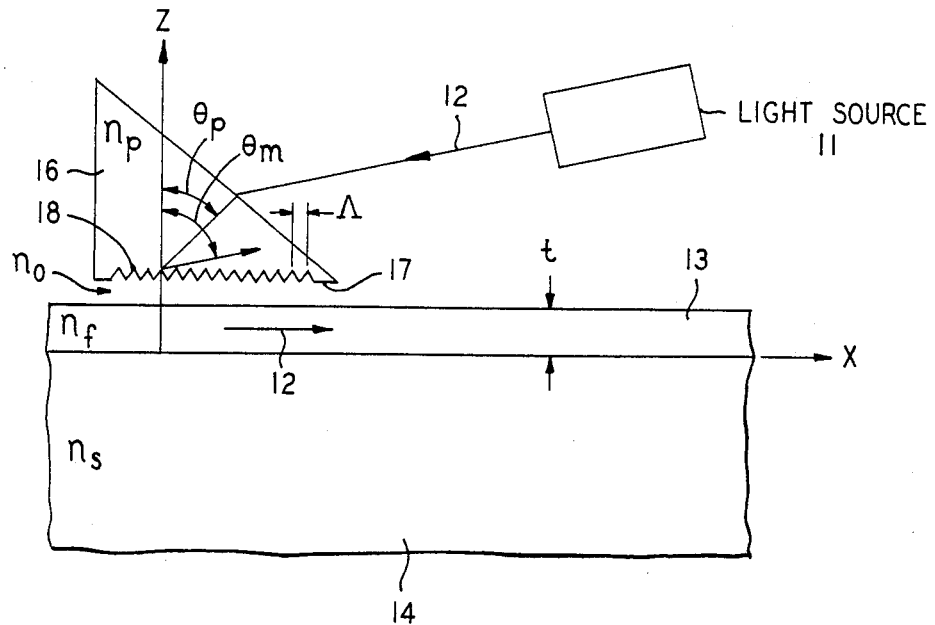
FIG. 1 is a diagrammatic view of an illustrative embodiment of the invention.

In FIG. 1, there is shown, greatly enlarged for convenience, a diagrammatic view of an embodiment of the prism-grating coupling arrangement of the invention.

The arrangement of FIG. 1 comprises source 11 of beam 12 of optical electromagnetic radiation, such as a conventional neodymium ion laser source (e.g., Nd:YAG) providing a coherent light output beam of 1.06 micrometers in wavelength. Any suitable source may, of course, be used; that being mentioned being by way of example only. A lens arrangement (not shown) may be used to focus beam 12, where necessary.

A thin-film waveguide 13 of any suitable optically transparent light-guiding material is mounted on substrate 14. The index of refraction $n_f$ of thin film 13 is chosen to exceed the index of refraction $n_s$ of substrate 14, typically by one percent or more. Both $n_f$ and $n_s$ exceed the index of refraction $n_o$ of the medium surrounding film 13 and substrate 14, which medium is assumed to be air (i.e., $n_o \approx 1.00$). Film 13 is provided with an essentially uniform thickness $t$ which is of the order of the wavelength of beam 12 to be coupled, so that beam 12, when coupled, is capable of propagating in film 13 in one or more guided modes along the $x$ axis as shown in the figure. Film 13 and substrate 14 illustratively have arbitrarily large dimensions in the directions normal to the plane of the drawing and along the $x$ axis.

The coupling is accomplished in the arrangement of FIG. 1 through the use of optically transparent prism 16 which is disposed with one of its principle surfaces, namely, surface 17, in close proximity to the upper major surface of film 13, and which has an index of refraction $n_p$. There is fabricated in surface 17 of prism 16 a fixed optical grating 18. Grating 18 illustratively comprises a spatially periodic variation in the height of prism surface 18 having a periodicity $\Lambda$ such that when beam 12 is made incident thereon at a selected angle inside prism 16, at least a portion of the beam is diffracted in a backward direction as seen in the figure. As will be explained in more detail hereinbelow, backward scattering from grating 18 is preferred, although forward scattering may also be used. Fabrication of grating 18 on prism 16 can be accomplished by any of a wide variety of well-known techniques including photolithographic techniques employing high resolution photoresists or electron resists, ion milling techniques, pressing and embossing techniques, and others. The depth of the grooves in surface 17 which comprise grating 18 may vary, and generally depends upon the particular fabrication technique employed. Relatively deep grooves (e.g., having a depth at least as large as the periodicity $\Lambda$ of the grating) are preferred.

The separation, or gap, between surface 17 of prism 16 and the upper major surface of film 13 is illustratively small enough so that the evanescent field of the component of the diffracted portion of beam 12 parallel to the $x$ axis extends across the gap into film 13. Although the optimum width of the gap would depend upon the relative values of $n_p$ and $n_o$ in any particular arrangement, the width of the gap is typically preferably less than one wavelength of beam 12 (i.e., less than 1.06 micrometers). If prism 16 is simply allowed to rest on film 13, a suitable gap will generally be maintained therebetween because of dust grains which adhere to the prism and film surfaces. If desired, the gap distance may be varied by applying pressure to the prism and/or to the film-substrate assembly.

To accomplish the coupling in the embodiment of FIG. 1, beam 12 from source 11 is directed onto prism 16 at an angle such that, after passing through prism 16, it is incident upon grating 18 at an angle $\theta_p$ as measured from the $z$ axis shown in FIG. 1 and diffracted therefrom in one or more grating orders. In FIG. 1, only one grating order is shown for convenience, the $-1$ order, which is diffracted at an angle $\theta_m$ with respect to the $z$ axis. The angle $\theta_p$ is selected to satisfy the phase-matching condition explained in more detail below; and it should be clear that the selection of the angle $\theta_p$ determines the orientation of the optical axis of beam 12 and source 11. The proper choice of the angle $\theta_p$ allows the evanescent field of the diffracted portion of beam 12 parallel to the $x$ axis to be phase-matched and coupled to one or more of the waveguide modes of film 13 which propagate along the $x$ axis. An efficient transfer of the light energy from beam 12 to film 13 is achieved in this way.

The coupling effect may be best explained by reference to the familiar "$k$" propagation vectors for the various components of beam 12 in the structure of FIG. 1. Grating 18 can be characterized by a grating vector $\overline{K}$ oriented along the $x$ axis and having a magnitude given by $$K = \frac{2\pi}{\Lambda} \qquad (1)$$

where $\Lambda$ is the periodicity of grating 18. Beam 12 has a free space propagation vector $\overline{k}$, the magnitude of which is given by $$k = \frac{2\pi}{\lambda} \qquad (2)$$

where $\lambda$ is the free space wavelength of beam 12. Within prism 16, the propagation vector of beam 12 is $\overline{k}_p$, the magnitude of which is given by $k_p = n_p k$. The diffracted wave in prism 16 has a propagation vector given by the vector sum $(\overline{K} + \overline{k}_p)$. Phase-matched evanescent field coupling to the $m^{th}$ waveguide mode of film 13 occurs when the diffracted light propagation vector $(\overline{K} + \overline{k}_p)$ has a component in the $x$ direction that matches the propagation constant $\beta_m$ for the $m^{th}$ waveguide mode in film 13, that is, when $$\beta_m = (\overline{K} + \overline{k}_p)_x \tag{3}$$

Considering only the first order reflected wave from grating 18 (i.e., the −1 grating order), the phase-matching condition becomes $$\beta_m = K - n_p k \sin \theta_p \tag{4}$$

When both sides of Equation (5) are divided by $k$ and equations (1) and (2) are substituted therein, the phase-matching condition can be written as $$\left(\frac{\beta}{k}\right)_m = \frac{\lambda}{\Lambda} - n_p \sin \theta_p \tag{5}$$

where $(\beta/k)_m$ is the effective index of refraction of film 13 for the $m^{th}$ waveguide mode.

It can be seen from Equation (5) that $(\beta/k)_m$ can be varied by varying the angle $\theta_p$. It is well known that a thin-film light guide, such as that depicted in FIG. 1, is ordinarily capable of supporting a large number of waveguide modes, each with a characteristic effective index of refraction $\beta/k$. When it is desired to couple exclusively to a particular waveguide mode, and its effective index of refraction is known, the $(\beta/k)_m$ of Equation (5) can be made equal to the effective index of refraction of the desired mode by proper selection of $\theta_p$. Varying $\theta_p$ varies the coupled mode. Any suitable means may be used for varying $\theta_p$, such as movement of source 11, interposition of light deflecting elements in the path of beam 12, or movement of the assembly of film 13 and substrate 14 relative to beam 12.

It may be noted that the evanescent field coupling effect utilizing the arrangement of FIG. 1 is substantially similar to that utilizing the conventional prism-film coupler. The essential difference, of course, results from the use of optical grating 18 on prism 16. Grating 18 permits efficient evanescent field coupling to the various waveguide modes of film 13 substantially without regard to the index of refraction $n_f$ of the film. Thus, the index of refraction $n_p$ of prism 16 can be smaller than, larger than, or the same as the index $n_f$ of film 13. The significance of this difference can be better appreciated from the following specific example.

Consider the structure of FIG. 1 in which film 13 is comprised of intrinsic gallium arsenide (GaAs) and in which substrate 14 is composed of the lower refractive index aluminum gallium arsenide ($Al_xGa_{1-x}As$). These materials are widely used in the optics art in the construction of various thin-film devices. Intrinsic GaAs has an index $n_f$ of about 3.47 at a wavelength of 1.06 micrometers. To couple to the GaAs film using the conventional prism-film coupler, one must find a material for the prism having an index that exceeds 3.47. All known optical materials possessing this requirement, however, are opaque at a wavelength of 1.06 micrometers. Monocrystalline silicon, for example, has an index at this wavelength of about 3.5 but is opaque to wavelengths less than about 1.15 micrometers. Coupling of light of 1.06 micrometers is thus not possible. With the arrangement of FIG. 1, on the other hand, the prism material may have any of a wide range of indices and accordingly can be any of a wide variety of optically transparent materials. For example, prism 16 could itself be composed of intrinsic gallium arsenide having an index $n_p$ equal to that of the film. Gallium arsenide is a desirable material for prism 16 in FIG. 1 for a number of reasons. First, the material is readily available and techniques for growing high optical quality samples are relatively well developed. Additionally, since the diffraction efficiency of a grating such as grating 18 of FIG. 1 can be shown to increase roughly as $(n_p{}^2 - n_o{}^2)^2$, and since $n_p$ is relatively large for gallium arsenide, relatively high diffraction efficiencies are possible with the material. Finally gallium arsenide is a relatively hard material which can be polished well and which will tend to be durable in use, thus allowing prism 16 to be reused many times.

Although only backward excitation is illustrated in FIG. 1, it should be noted that grating 18 may also be designed for forward excitation, in which case beam 12 would be incident from the left side of prism 16 rather than from the right side as seen in the figure. The particular arrangement illustrated in FIG. 1 is the preferred arrangement of the invention, since high diffraction efficiencies are more readily obtained when grating 18 is designed for backward scattering. See, for example, the article by K. Ogawa et al., in Volume QE-9 of the *IEEE Journal of Quantum Electronics*, page 29 (1973). Higher diffraction efficiencies with grating 18 provide a more efficient transfer of the light energy in beam 12 to film 13.

Additionally, although only the first order reflected wave is illustrated in FIG. 1 and discussed above, it should be noted that beam 12 incident on grating 18 will ordinarily excite, in addition to the first order reflected wave, zeroth order and possibly higher order transmitted and reflected waves. Maximum coupling efficiency from a free-space light beam, or so-called radiation mode, to a film-guided mode is accomplished by a grating when only the first order wave is excited by the grating. Consequently, if relatively high coupling efficiencies are desirable with the arrangement of FIG. 1, one should maximize the first order reflected wave, or better, its component in the $x$ direction and suppress the other unwanted diffraction orders. One way of accomplishing this is to choose the grating periodicity $\Lambda$ such that the Bragg condition for beam 12 at grating 18 is approximately satisfied. As can be shown from the discussion in the article by H. Kogelnik and T. P. Sosnowski in Volume 49 of the *Bell System Technical Journal*, page 1602 (Sept. 1970), the Bragg condition for the grating arrangement of FIG. 1 is obeyed when $$\frac{K}{k} = \frac{\lambda}{\Lambda} = 2n_p \sin\theta_p . \tag{6}$$

Assuming an angle of incidence $\theta_p$ equal to 60°, Equation (6) shows that the grating periodicity $\Lambda$ for a gallium arsenide prism ($n_p = 3.47$) to be approximately 1200 Angstrom units (approximately 8300 lines per millimeter). Grating periodicities of this magnitude, though admittedly small, are within the state of the art of grating fabrication techniques. See, for example, the article by C. V. Shank and R. V. Schmidt, in Volume 23 of *Applied Physics Letters*, page 154 (August 1973). Where less than optimum coupling efficiencies are sufficient with the arrangement of FIG. 1, for example, where the arrangement is to be used in the laboratory or on the production line for testing thin-film materials, forward scattering from the grating and larger grating periodicities may be employed.

Figure 2:
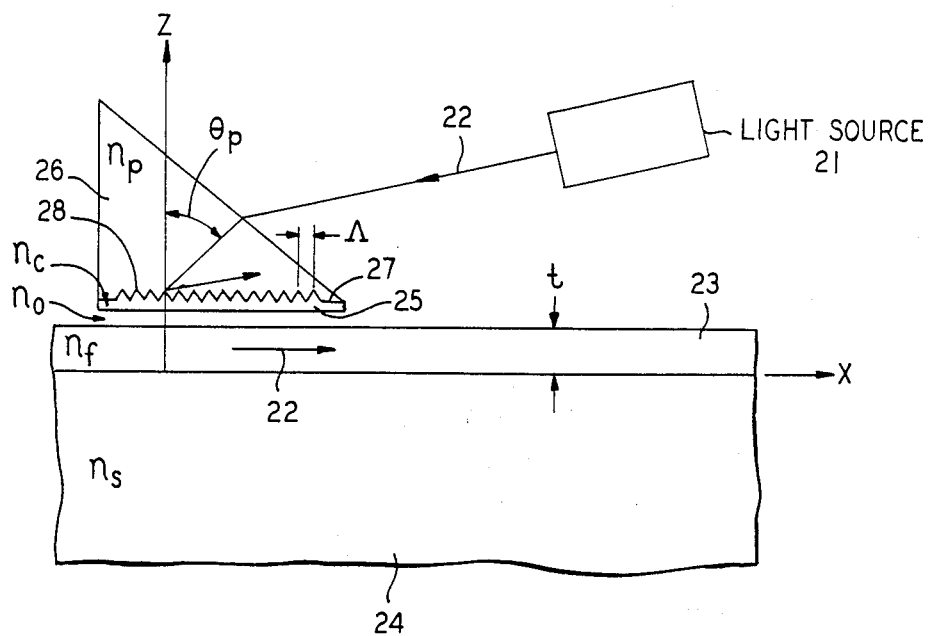
FIG. 2 is a diagrammatic view of a modified version of the embodiment of FIG. 1 including a protective cladding.

FIG. 2 of the drawing illustrates a modified version of the embodiment of FIG. 1 including a protective layer of cladding 25 disposed on grating surface 27 of prism 26. With the exception of cladding 25, it will be noted that the arrangement of FIG. 2 is identical to that of FIG. 1, the elements being referenced by numerals 10 units higher than their corresponding elements in FIG. 1. Cladding 25 serves a two-fold purpose in the arrangement of FIG. 2: first, it serves to prevent any damage to grating 28 that may result through continued use of the device for coupling into or out of various thin-film waveguides; and secondly, it serves to prevent any damage that grating 28 may cause to thin-film 23 during coupling. Cladding 25 is thus an optically transparent material having an index of refraction $n_c$ which is less than $n_p$ as well as less than $n_f$, but greater than $n_o$. Additionally, cladding 25 is disposed on prism 26 so as to adhere to surface 27 and to form a relatively smooth and flat exterior surface as compared to surface 27. It has a thickness which is sufficient to fill the grooves of grating 28 and to extend below surface 27 by an amount which provides the desired protection. Cladding layer thicknesses of about 0.5 micrometers below surface 27 should be adequate for most applications.

One suitable material for protective cladding 25 is a flexible low-index polymer such as a copolymer of hexafluoropropene and vinyl fluoride, having an index $n_c$ equal to 1.5, which may be deposited on surface 27 by evaporation from a solution of methylethyl ketone (Suziki et al., *Applied Optics*, Volume 13, No. 1, Jan. 1974). Another suitable material is $Ga_xAl_{1-x}As$, which can be grown by liquid phase epitaxy on a prism of GaAs, with an index $n_c$ less than $n_p$ by $\Delta n \cong 0.4x$. Other known optical materials meeting the above-specified requirements may be used.

Various other modifications of the above-described illustrative embodiments will be realized by those skilled in the art without departing from the scope of the invention, as defined by the appended claims. For example, other optical sources of differing wavelengths and other optical materials of differing indices may be used in the embodiments. The optical region is assumed for purposes of the invention to include collectively the ultraviolet, visible and infrared portions of the electromagnetic spectrum. Additionally, because of the reciprocity of the optics involved in the arrangement, the embodiments of FIGS. 1 and 2 may be used for output coupling as well as for input coupling. Thus, in FIG. 1, guided light energy propagating in film 13 along the minus $x$ direction will be coupled out of the film by grating 18 on prism 16. Output coupling results from the interaction of the evanescent field of the guided light with grating 18. The angle $\theta_p$ at which the $m^{th}$ waveguide mode emerges from the film can be determined by Equation (5) above, assuming its effective refractive index in the film is known. For output coupling, light source 11 would be replaced by a detector or other suitable utilization apparatus.

Furthermore, in the embodiment of FIG. 1, the medium in the separation between prism 16 and film 13 need not be air, but may be any material having an index $n_o$ less than $n_p$ and $n_f$, respectively. For example, it may be a thin layer of an optically transparent liquid such as x-chloronaphthalene ($n_o = 1.633$), or carbon tetrachloride $C_2Cl_4$ ($n_o = 1.50$) upon which prism 16 rests. Prism 16 could thus be readily moved along the layer to various portions of film 13.

I claim:

1. An optical coupling arrangement of the type comprising
    a body of optically transparent material having an index of refraction $n_f$ and two opposing major surfaces separated by a distance proportioned for guiding a beam of optical electromagnetic radiation, and
    a prism of optically transparent material having an index of refraction $n_p$, said prism having a surface disposed essentially parallel to and separated by a gap of index of refraction $n_o$ from one of the major surfaces of said body, $n_o$ being smaller in value than $n_f$ and $n_p$, respectively, said arrangement being characterized in that
    said surface of said prism includes a fixed optical grating having a grating periodicity selected for diffracting at least a portion of the beam of optical radiation incident thereon inside said prism, said surface of said prism being oriented to receive said beam at an angle providing coupling through said gap between the evanescent field of a diffracted portion of said beam and a propagating waveguide mode in said body.

2. The coupling arrangement of claim 1 in which the index of refraction $n_f$ of said body has a value at least as large as that of the index of refraction $n_p$ of said prism.

3. The coupling arrangement of claim 1 for use as an input coupler including a source of said beam of optical radiation, means for directing the incidence of said beam on said grating, and in which said body comprises a thin waveguiding film having a thickness of the order of the wavelength of said beam, said gap between said prism and said body being less than the wavelength of said beam.

4. The coupling arrangement of claim 3 in which said grating comprises a spatially periodic variation in the height of said prism surface having a periodicity $\Lambda$ selected for diffracting said portion of said beam essentially in a backward direction relative to the direction of incidence of said beam.

5. The coupling arrangement of claim 4 in which said beam is directed at an angle $\theta_p$ to the normal to said prism surface such that the relationship $$\left(\frac{\beta}{k}\right)_m = \frac{\lambda}{\Lambda} - n_p \sin \theta_p$$

is approximately satisfied, where $(\beta/k)_m$ is the effective index of refraction of said thin film for the $m^{th}$ waveguide mode propagating in said film, $\lambda$ is the free space wavelength of said beam, and $\Lambda$ is the periodicity of said grating.

6. The coupling arrangement of claim 5 in which the periodicity $\Lambda$ of said grating and the angle $\theta_p$ are selected such that the relationship $$\frac{\lambda}{\Lambda} = 2n_p \sin \theta_p$$

is approximately satisfied.

7. The coupling arrangement of claim 5 in which said source is a neodymium ion laser providing said beam of approximately 1.06 micrometers in wavelength and in which the material of said prism and of said thin waveguiding film consists essentially of gallium arsenide.

8. The coupling arrangement of claim 1 in which said surface of said prism is coated with a layer of transparent protective cladding material having a relatively flat exterior surface as compared to said prism surface and an index of refraction $n_c$ which is less than $n_p$ and $n_f$, respectively.

9. The coupling arrangement of claim 8 in which said protective cladding is a flexible polymer material.

10. The coupling arrangement of claim 8 in which said prism consists essentially of gallium arsenide and said protective cladding consists essentially of aluminum gallium arsenide.

* * * * *